Dec. 28, 1948.  W. G. HOKETT  2,457,236
VEHICULAR MOTION PICTURE CAMERA
Filed Dec. 4, 1947

INVENTOR.
William G. Hokett
BY
Scott L. Norvial

Patented Dec. 28, 1948

2,457,236

UNITED STATES PATENT OFFICE 2,457,236

VEHICULAR MOTION-PICTURE CAMERA

William G. Hokett, Phoenix, Ariz.

Application December 4, 1947, Serial No. 789,657

2 Claims. (Cl. 88—16)

This invention relates to vehicular motion picture cameras adapted to take pictures of objects in the vicinity of the vehicle while it is in motion.

Heretofore there have been numerous camera devices made or proposed and adapted for use on automobiles or other vehicles whereby motion pictures of objects in the path of the automobile could be taken at pre-determined times or intervals, or at the will of the operator. However, each of these devices, so far as I have been able to determine, has been operated, driven and controlled by electrical means and was, therefore, subject to the operative maintenance of the electrical system of the vehicle. Since one of the requisites of devices of this type is that they should operate under all adverse conditions, and with a minimum of maintenance, and even though parts of the vehicle are damaged, one of the objects of my invention is to provide a device which is simple and sturdy in operation and construction, positive in its action, and not dependent upon any electrical battery or system of the vehicle.

A second object is to provide a moving picture camera for mounting on or within a motor vehicle which is operated by vacuum derived from the intake manifold of the engine.

A third object is to provide such a camera mechanism with means for maintaining vacuum independent of the continuous operation of the engine.

A fourth object is to provide means for operating the camera when desired, and at certain other times when parts of the vehicle operating mechanism are actuated.

Other objects will appear hereinafter.

I attain the foregoing objects by means of the devices and construction illustrated in the accompanying drawings in which—

Figure 3:
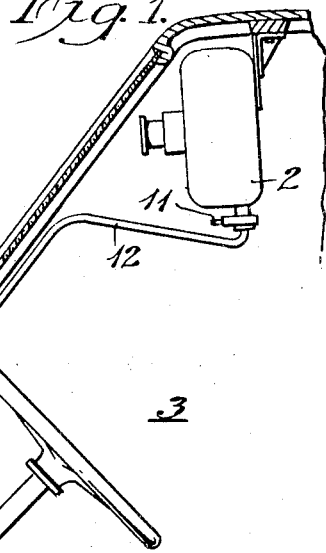
Figure 1:
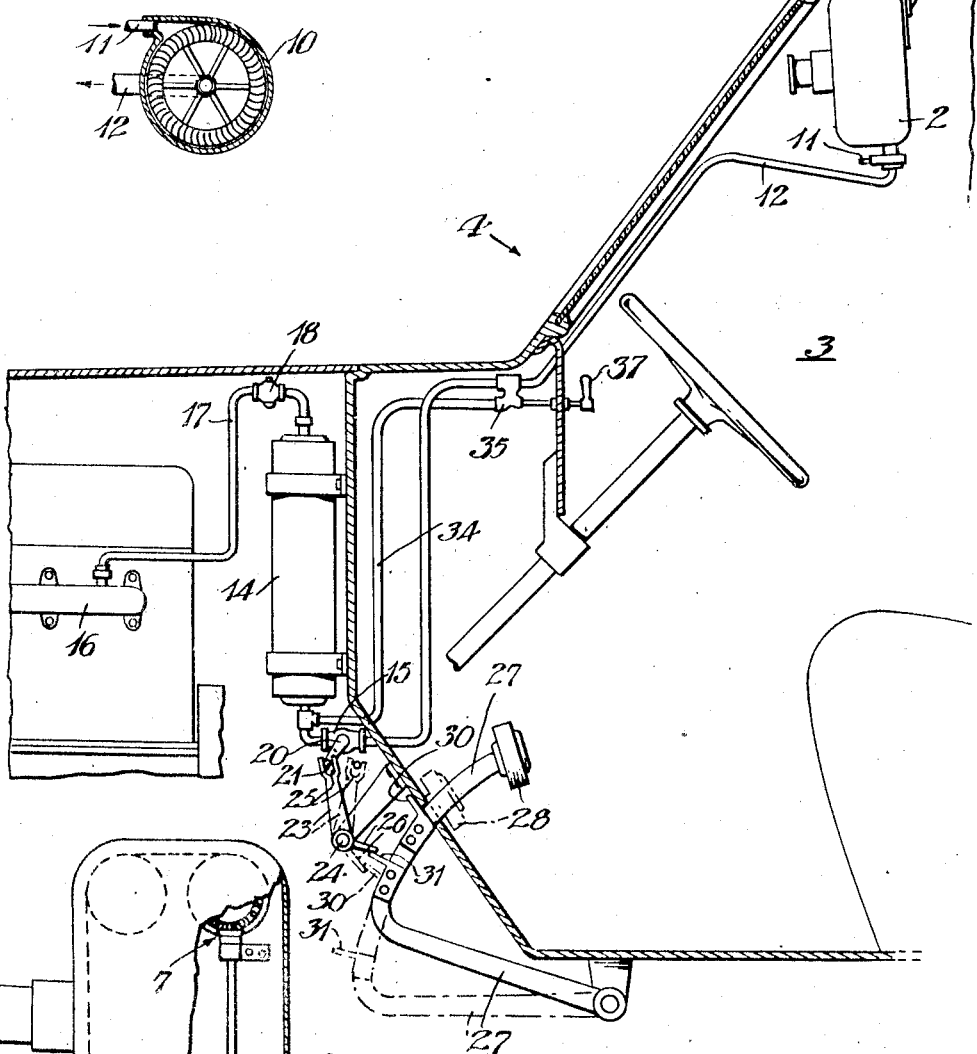
Figure 2:
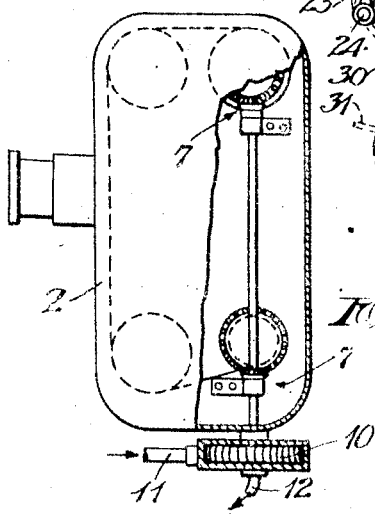

Figure 1 is a sectional elevation of an automobile driving compartment including my improved camera operating device;

Figure 2, a side elevation of a motion picture camera adapted for use with my improvement; and Figure 3, a plan view of the vacuum turbine used to drive said camera with parts sectioned off to show the interior.

Similar numerals designated similar parts in the several views:

The moving picture camera 2 is positioned within the driving compartment 3 of the vehicle 4, as high as possible to obtain the best possible view of the road in front of the vehicle and any on-coming traffic.

The optical and shutter portions of the camera I have are conventional. However a wide angle lens may be used on the camera or even a prismatic direction lens.

The film spools of the camera are driven by gears 7, shaft 8, and vacuum turbine 10. The inlet jet 11 of this turbine is open to the atmosphere, while its outlet is connected by tube 12 to vacuum tank 14, through throttle valve 15. Vacuum is drawn on tank 14 by connecting it to engine intake manifold 16 through tube 17, in which check valve 18 is included.

Throttle valve 15 has a plug provided with an arm 20 carrying a bearing pin 21 at its outer end. A lever 23 pivoted at 24 carries a fork 25 at its upper end which slidably engages pin 21 of arm 20. At its lower shorter end it has a plate 26 which contacts lug 30 on reach bar 27 of brake pedal 28. Lug 30 is attached to bar 27 so that when pedal 28 is at released position it will be above the normal position of plate 26 with arm 20 holding valve 15 closed. When brake pedal 28 is depressed to set the brakes, plate 26 is moved downward, fork 25 moved upwards, and arm 20 moved to a position to open valve 15. These movements are indicated by dotted outlines, of the several parts, Figure 1. When pedal 28 is released, lug 31, positioned lower on bar 27, trips plate 26 back to effect closing of valve 15.

In addition to the above described parts, valve 15 is by-passed by tube 34 which includes manually operable valve 35 positioned at a convenient position within the operating compartment 3.

In use, the parts being installed as shown, film is loaded into camera 2 and the engine started. During the first few minutes of operation, vacuum is drawn on tank 14 equivalent to the manifold pressure or draw. Check valve 18 holds this vacuum until throttle valve 15 or manual valve 35 is opened. As the vehicle is operated throttle valve 15 opens each time the brake pedal is depressed sufficiently to engage lug 30 with plate 26. This causes vacuum turbine 10 to operate camera 2 and photograph road conditions and traffic adjacent the vehicle until the brake pedal is released. Obviously this operation is automatic, so far as the driver of the vehicle is concerned. When, however, the driver desires to photograph road conditions for any length of time and independently of brake operation, he opens valve 35 by using lever handle 37 which is positioned on the dashboard of the vehicle within easy reach of a person occupying the operating compartment

3. Thus a record of conditions under which the vehicle is operated can be photographed.

The parts and their installation and operation as here illustrated and described is considered to be merely exemplary. Many substitutions of parts and modifications of the exact devices shown can be made without departing from the spirit and intendments of the invention. For example: turbine 10 may be replaced by a reciprocating vacuum engine; the brake actuating mechanism may be replaced by devices to open valve 15 when the steering wheel is turned to predetermined degree; or a vacuum motor may be installed between the engine manifold and tank 14 and arranged to operate a vacuum pump having less volume capacity but capable of drawing a higher vacuum than that of the engine manifold on tank 14. So, also, the use of the vacuum principle is adapted for use on any motor type of power driven vehicle where pressure less than that of the atmosphere may be provided. However, in any case, the invention makes possible the use of sturdy and simple parts, not likely to get out of order, and when properly proportioned furnish an efficient means for attaining the results desired.

In view of the foregoing I wish to be limited only by the following claims.

I claim:

1. A vehicular motion picture camera operating device, for installation in a motor vehicle having a driver's compartment and an internal combustion engine, having an intake manifold and a brake pedal, including, in combination, a motion picture camera mounted on said vehicle positioned to photograph road conditions ahead of said vehicle, a vacuum motor attached to said camera and adapted to drive the photographing mechanism thereof; a tank connected to the engine manifold of said vehicle, a check valve operative between said manifold and said tank to retain vacuum drawn in said tank by suction from said manifold; a tube, including a throttle valve, connecting said tank to said vacuum motor, mechanism including an arm operative on said valve, and a lever actuated by a brake pedal of said vehicle adapted to open and close said valve corresponding to the operation thereof.

2. A vehicular motion picture camera operating device, for installation in a motor vehicle having a driver's compartment and an internal combustion engine, having an intake manifold and a brake pedal, including, in combination, a motion picture camera mounted on said vehicle positioned to photograph road conditions ahead of said vehicle, a vacuum motor attached to said camera and adapted to drive the photographing mechanism thereof; a tank connected to the engine manifold of said vehicle, a check valve operative between said manifold and said tank to retain vacuum drawn in said tank by suction from said manifold; a tube, including a throttle valve, connecting said tank to said vacuum motor, mechanism including an arm operative on said valve, and a lever actuated by a brake pedal of said vehicle adapted to open and close said valve corresponding to the operation thereof, and a tube including a manually operable valve by-passing said throttle valve, whereby said vacuum motor may be connected to said vacuum tank manually and operated independently of said throttle valve.

WILLIAM G. HOKETT.

REFERENCES CITED

The following references are of record in the file of this patent:

UNITED STATES PATENTS

| Number | Name | Date |
|---|---|---|
| 1,640,526 | Bragg et al. | Aug. 30, 1927 |
| 1,940,434 | Nistri | Dec. 19, 1933 |
| 2,428,273 | Finnegan et al. | Sept. 30, 1947 |

FOREIGN PATENTS

| Number | Country | Date |
|---|---|---|
| 434,242 | Germany | Sept. 17, 1929 |